United States Patent
Krell et al.

(10) Patent No.: US 8,291,483 B2
(45) Date of Patent: Oct. 16, 2012

(54) REMOTE NETWORK DEVICE WITH SECURITY POLICY FAILSAFE

(75) Inventors: Sherry Krell, Sacramento, CA (US); James Smith, Fair Oaks, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1511 days.

(21) Appl. No.: 11/799,206

(22) Filed: Apr. 30, 2007

(65) Prior Publication Data
US 2008/0271135 A1 Oct. 30, 2008

(51) Int. Cl.
*H04L 29/06* (2006.01)
*G06F 15/16* (2006.01)
*G06F 11/30* (2006.01)

(52) U.S. Cl. .............................. 726/11; 726/3
(58) Field of Classification Search ........................ None
See application file for complete search history.

(56) References Cited

U.S. PATENT DOCUMENTS

| | | | |
|---|---|---|---|
| 6,212,558 B1 | 4/2001 | Antur et al. | |
| 6,240,533 B1 * | 5/2001 | Slemmer | 714/48 |
| 6,327,608 B1 * | 12/2001 | Dillingham | 709/203 |
| 6,473,800 B1 | 10/2002 | Jerger et al. | |
| 6,662,228 B1 * | 12/2003 | Limsico | 709/225 |
| 6,854,063 B1 * | 2/2005 | Qu et al. | 726/13 |
| 6,871,344 B2 | 3/2005 | Grier et al. | 717/162 |
| 7,028,334 B2 * | 4/2006 | Tuomenoksa | 726/3 |
| 7,055,173 B1 * | 5/2006 | Chaganty et al. | 726/11 |
| 7,069,434 B1 | 6/2006 | Ilnicki et al. | |
| 7,073,170 B2 * | 7/2006 | Grier et al. | 717/162 |
| 7,076,400 B2 * | 7/2006 | Dulberg et al. | 702/184 |
| 7,131,143 B1 | 10/2006 | LaMacchia et al. | |
| 7,140,035 B1 | 11/2006 | Karch | |
| 7,146,639 B2 * | 12/2006 | Bartal et al. | 726/11 |
| 7,370,354 B2 * | 5/2008 | Izatt et al. | 726/11 |
| 7,392,539 B2 * | 6/2008 | Brooks et al. | 726/11 |
| 7,392,540 B1 * | 6/2008 | Pell | 726/12 |
| 7,409,318 B2 * | 8/2008 | Dulberg et al. | 702/184 |
| 7,472,414 B2 * | 12/2008 | Izatt et al. | 726/11 |
| 7,509,673 B2 * | 3/2009 | Swander et al. | 726/11 |
| 7,545,753 B2 * | 6/2009 | Stirbu | 370/252 |
| 7,606,854 B2 * | 10/2009 | Ellis, III | 709/201 |
| 7,620,707 B1 * | 11/2009 | Sutherland et al. | 709/223 |
| 7,644,436 B2 * | 1/2010 | Izatt et al. | 726/11 |
| 7,698,400 B1 * | 4/2010 | Beloussov et al. | 709/223 |
| 8,201,234 B2 * | 6/2012 | Diaz-Cuellar et al. | 726/11 |
| 2003/0046549 A1 * | 3/2003 | Sakata | 713/182 |
| 2004/0260810 A1 * | 12/2004 | Bernoth | 709/225 |
| 2005/0022012 A1 * | 1/2005 | Bluestone et al. | 713/201 |
| 2005/0086494 A1 | 4/2005 | Carley | |
| 2005/0086511 A1 | 4/2005 | Balacheff et al. | |
| 2005/0138416 A1 * | 6/2005 | Qian et al. | 713/201 |
| 2005/0240906 A1 * | 10/2005 | Kinderknecht et al. | 717/136 |

(Continued)

OTHER PUBLICATIONS

Mizuno et al, "A New Remote Configurable Firewall System for Home-Use Gateways", 2004, IEEE, NTT Information Sharing Platform Laboratories, p. 599-601.*

*Primary Examiner* — Christopher Revak

(57) ABSTRACT

A remote network device having a network security policy, includes: a firewall component embedded within the network device to filter data flow with a network; a user-defined network security policy for the firewall component to define constraints on data flows permitted by the network device; and a failsafe protocol to enable remote control of the device independent of the user-defined network security policy and the firewall filter.

20 Claims, 3 Drawing Sheets

U.S. PATENT DOCUMENTS

| | | |
|---|---|---|
| 2005/0273513 A1 | 12/2005 | Panasyuk et al. |
| 2005/0289647 A1* | 12/2005 | Izatt et al. .......... 726/11 |
| 2006/0047784 A1* | 3/2006 | Li et al. .......... 709/220 |
| 2006/0107036 A1 | 5/2006 | Randle et al. |
| 2006/0126603 A1 | 6/2006 | Shimizu et al. |
| 2006/0161653 A1 | 7/2006 | Webb et al. |
| 2006/0174337 A1* | 8/2006 | Bernoth .......... 726/11 |
| 2006/0195896 A1* | 8/2006 | Fulp et al. .......... 726/11 |
| 2006/0242684 A1 | 10/2006 | Russell et al. |
| 2006/0277594 A1 | 12/2006 | Chiavegatto, Jr. et al. |
| 2006/0282887 A1 | 12/2006 | Trumper et al. |
| 2008/0028457 A1* | 1/2008 | Diaz-Cuellar et al. .......... 726/12 |
| 2008/0154826 A1* | 6/2008 | Backof et al. .......... 706/45 |
| 2008/0155249 A1* | 6/2008 | Backof et al. .......... 713/100 |
| 2008/0250473 A1* | 10/2008 | Massimiliano et al. .......... 726/1 |
| 2011/0072506 A1* | 3/2011 | Law et al. .......... 726/11 |

* cited by examiner

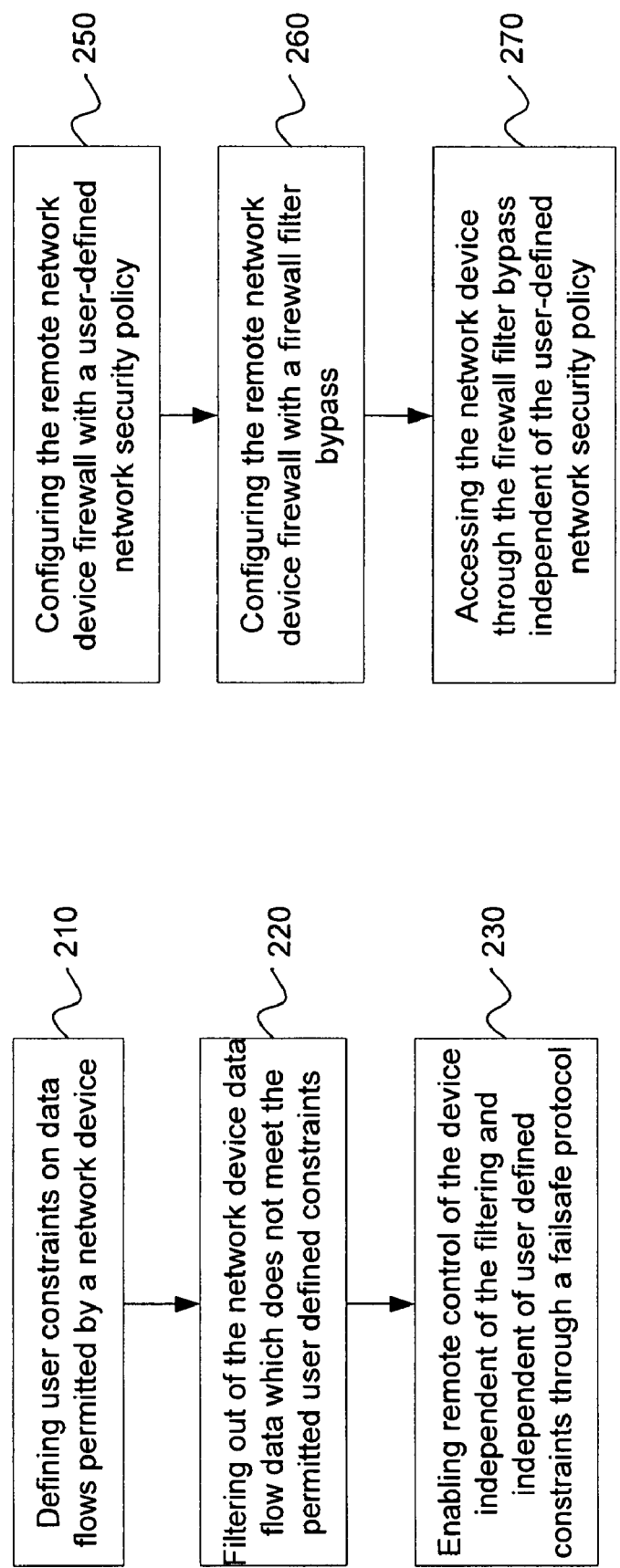

REMOTE NETWORK DEVICE WITH SECURITY POLICY FAILSAFE

BACKGROUND

Configuring an Internet Protocol Security (IPsec) and/or a firewall security policy is inherently challenging. The main purpose of a network security policy is to lock down a device by restricting how it can be accessed. Incorrectly configuring a network security policy is very easy to do. Also, content filtering rules may change after the initial configuration, necessitating a change to the network security policy. For example, a set of filters that allows employees to access local servers might need to be updated to allow access through a Virtual Private Network (VPN) but prevent users from outside the company from accessing servers on the company's side of the firewall. Also, networks are often re-designed, and new content and new forms of viruses need to be filtered.

Devices may be unreachable due to network traffic errors, network security protocol errors, or any of a host of technical errors. Failover mechanisms, where a device may enter a failover mode after a predetermined time-out, switch control to a backup unit and reboot the failed device. A reboot, however, may not fix a security protocol error embedded in a device. Also, such failsafe mechanisms require standby or backup devices which add to the total cost of ownership.

More and more devices are being deployed headless without any I/O peripherals other than a network interface card. Therefore, even configuring an Internet Protocol address for a remote headless device is initially challenging. Loss of network access to a device can mean a trip to the remote site and/or resetting a device to factory defaults. This can mean anything from erasing the entire configuration on the device to erasing only the network security policy on the device. This however requires the user to re-configure the entire security policy when there may be only a very minor change needed to fix the problem.

Disabling the network security policy in lieu of losing access to the device means the device is accessible to everyone without any network security policy being enforced. Alternatively, a network security policy can be setup for a short temporary period of time for test prior to full installation. While this allows recovery, the user must wait out the temporary time period for full access. Devices which are unreachable over a network may initiate a failover reboot (power cycle) but may not be able to remedy a network security policy.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 3 is a flow chart of a method of enabling remote control of a network device in accordance with an embodiment of the present invention; and FIG. 4 is a flow chart of a method of enabling access to a network device through a bypass in accordance with an embodiment of the present invention.

DETAILED DESCRIPTION OF EXAMPLE EMBODIMENTS

Figure 1:
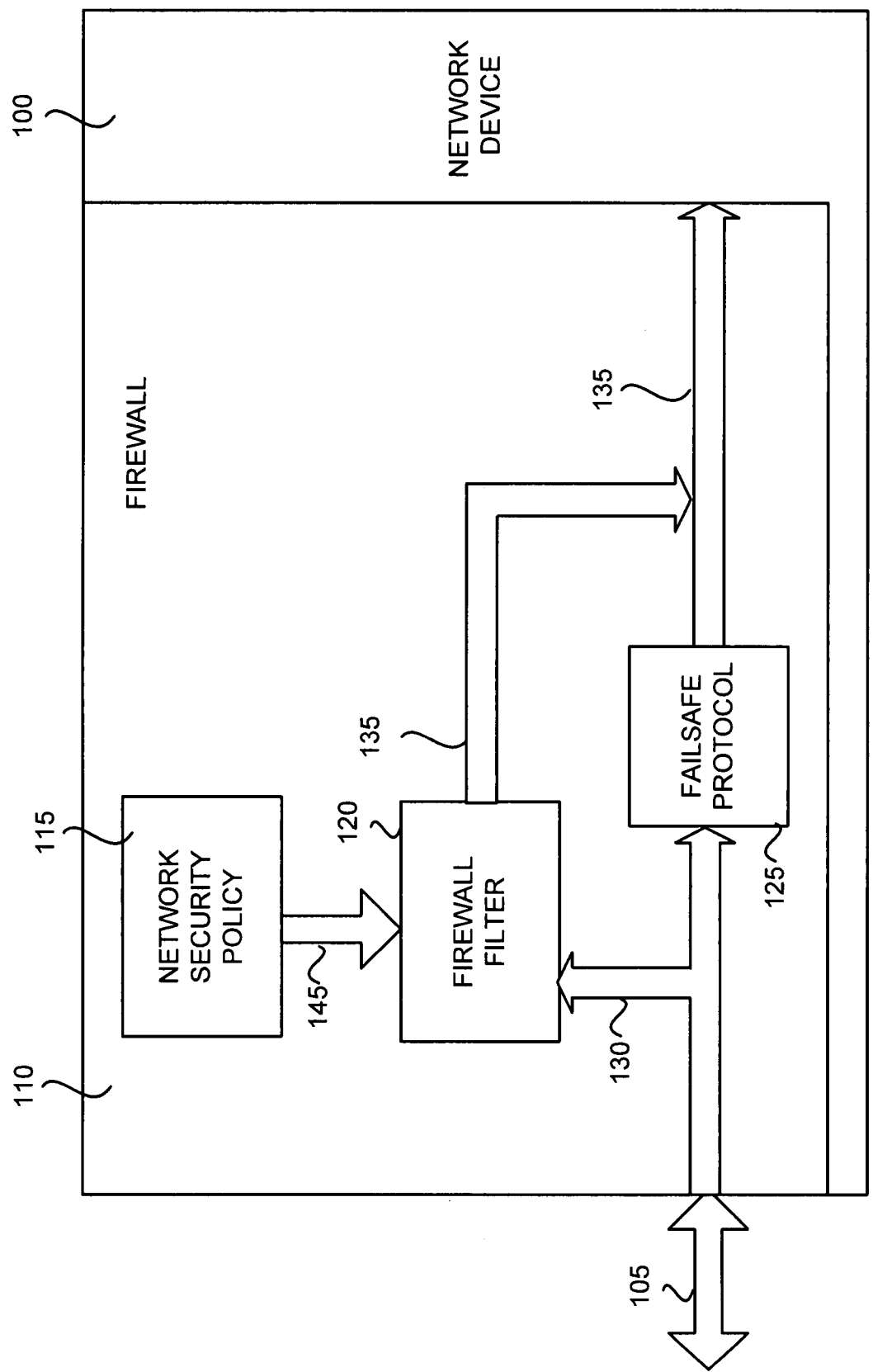
FIG. 1 is a block diagram of a network device in accordance with an embodiment of the present invention.

In describing embodiments of the present invention, the following terminology will be used.

The singular forms "a," "an," and "the" include plural referents unless the context clearly dictates otherwise. Thus, for example, reference to "a device" includes reference to one or more of such devices.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

To overcome the problem of losing access and control to a headless or remotely accessible device, failsafe protocol options can be included within a network device. In accordance with an embodiment, a remote network device is configured prior to a user having access to the device with multiple failsafe protocol options to bypass a user-defined network security policy. A user may only disable a failsafe protocol option but may not reconfigure the failsafe protocol itself. Therefore, the failsafe protocol is independent of the user-defined network security policy and a firewall filter and will always allow access to the device, no matter how the user-defined network security policy is ordered or setup. There is no time-out or reboot required of the user. Therefore, the user does not have to wait any period of time for access to the network device and the network security policy is not required to be disabled or erased.

The failsafe option allows the user to continue to access and control the device even when the network security policy is unusable or the device is otherwise unreachable. A user may be a network administrator, a network engineer, a network customer, a network client, and the like. A user is allowed to fix the network security policy without resetting a device to factory defaults. This can be done using any secure protocol that provides authentication and encryption such as Transport Layer Security (TLS), Secure Shell (SSH), and the Internet-Standard Management Framework, aka Simple Network Management Protocol (SNMPv3), etc.

The user can choose a failsafe protocol prior to configuring the network security policy. Dataflow constraints permitted by the remote network device are defined in the configuration. Once the network security policy is enabled, if the security policy fails, the user can then access the device using the failsafe secure protocol. The user can modify the network security policy via this failsafe access method, and continue to test the security policy as it is updated.

If no secure protocols are available for the failsafe access, an unsecured protocol such as Hypertext Transmission Protocol (HTTP), or the Teletype Network (telnet), etc may be used. This will only allow access to the device over one unsecured protocol as opposed to opening up the entire device. The failsafe access and control of the remote network device can also be disabled as soon as the network security policy is proven to work correctly or is no longer needed for testing purposes.

A remote network device providing a failsafe protocol to enable access when the device is otherwise unreachable due to its unusable network security policy is one embodiment of the present invention. It can include a firewall component embedded within the network device to filter data flow with a network. The remote network device also has a user-defined network security policy for the firewall component to define constraints on data flows permitted by the network device. Additionally, a failsafe protocol enables remote control of the device independent of the user-defined network security policy.

FIG. 1 is a block diagram of the firewall component within a network device in the network in accordance with an embodiment of the present invention. The network device 100 may be accessed from the network link 105 through its firewall 110. The firewall component 110 of the network device 100 includes a user-defined network security policy 115, a firewall filter 120, and a failsafe protocol 125. The data-in link 130 enables dataflow between the network link 105, the failsafe protocol 125 and the firewall filter 120. The data-out link 135 enables dataflow between the firewall 110 and the network device 100. Dataflow through the data-out link 135 may come from either the firewall filter 120 or the failsafe protocol 125. A disabling means 140, shown in FIG. 2, allows data and control to route through the firewall filter 120 rather than the failsafe protocol 125. The disabling means may be implemented in the failsafe protocol 125.

Figure 2:
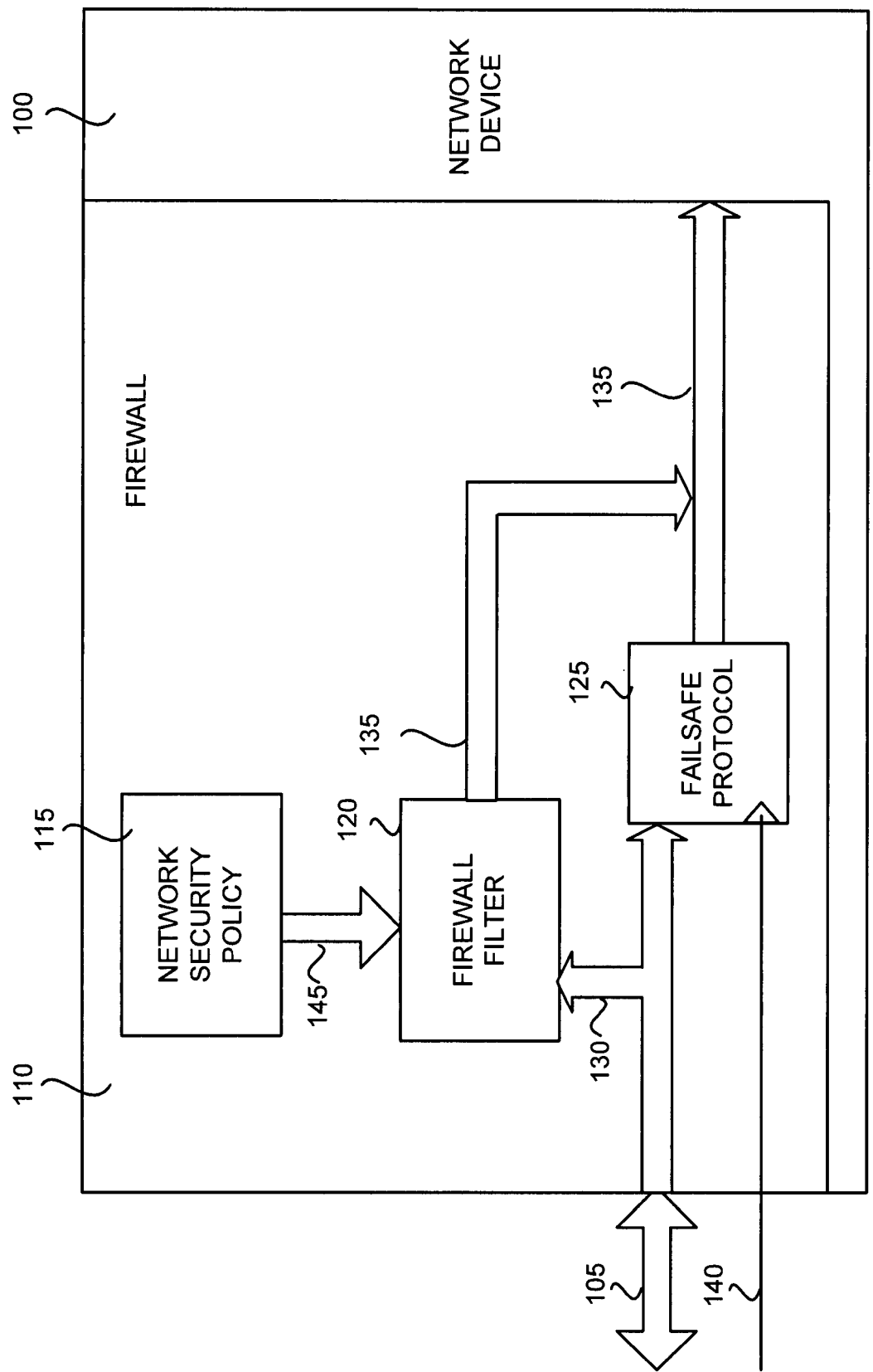
FIG. 2 is a block diagram of a network device in accordance with an embodiment including a user disable of the failsafe protocol.

The failsafe protocol 125 acts as a switch which blocks dataflow unless it is needed to bypass the firewall filter 120 in which case it allows dataflow to the network device 100. The failsafe protocol 125 enables remote control of the network device 100 independent of the user-defined network security policy 115 and the firewall filter 120. The firewall filter 120 filters the dataflow 130 according to the constraints defined by the user-defined network security policy 115. The network security policy 115 defines constraints on the dataflow to the firewall filter 120 through the link 145. FIG. 2 includes a disable 140 for a user to turn off a failsafe protocol option but not to reconfigure the failsafe protocol itself. The disable line may be integrated with the network link 105 or be accessible independently as shown.

The network device above comprehends a distributed firewall implemented on several network devices where correspondingly the failsafe protocol may reside on one or several of such network devices. The remote network device may be a headless device without any local user interface. Also as can be appreciated, the network mentioned therein may include the Internet. An embodiment of the system above can include a means for disabling the failsafe protocol including hardware and software implementations.

A method to maintain remote control access through a network to a device that is otherwise unreachable due to its unusable network security policy is included in an embodiment. This method may include a user defining constraints in the security policy on data flows permitted by the network device for filtering out data which does not meet the permitted defined constraints. Also this method enables remote control of the device for a user independently of the filtering means and independently of the means for defining constraints on dataflow. Means for defining constraints may include priority ordered lists and hierarchically ordered lists. Filtering means may include software and hardware implementations for blocking spam, executable attachments, pornography and Trojan viruses while allowing email and web access for example.

Also in accordance with an embodiment, is a method for maintaining access to a remote device through its firewall when the network device has an unusable network security policy. This method includes a user configuring the remote device firewall with a network security and firewall filter bypass. The method also includes a user accessing the network device through the bypass independent of a user-defined network security policy and the firewall filter. Configuration parameters may be changed without resetting default settings on the remote network device.

FIG. 3 is a flow chart of a method of enabling remote control of a network device in accordance with an embodiment of the invention. The method includes the operation of a user defining 210 constraints on data flows permitted by the network device to establish a network security policy, filtering 220 out data which does not meet the permitted defined constraints to implement the network security policy, and enabling 230 remote control and/or access of the device for a user independently of the filtering means and independently of the defined constraints on dataflow.

FIG. 4 is a flow chart of a method in accordance with an embodiment of the invention. The method includes the operation of a user configuring 250 the remote network device firewall with a network security policy. Also the method includes configuring 260 the remote network device firewall with a firewall filter bypass. A step of accessing 270 the network device through the bypass is also included.

The failsafe protocol allows dataflow to the remote device and control of the remote device to bypass the security policy and firewall filter. The failsafe protocol operates as another firewall filter using a set of constraints independent of the user-defined network security policy constraints on dataflow. A user or administrator may disable the failsafe protocol option but may not reconfigure the failsafe options themselves. These constraints in the failsafe protocol can secure and encrypt transactions between the network and the remote device. Therefore, despite failure of the network security protocol, access to and control of the remote device is maintained.

The method can also include testing the network security policy through the firewall failsafe and disabling the failsafe protocol when the security policy is proven to work correctly or is no longer needed for testing purposes. Also in accordance with an embodiment, modifying the network security policy through the firewall failsafe is accomplished by distributed sources through the firewall failsafe. The modification of the network security policy includes changing dataflow constraints and security policy configuration parameters without resetting default settings on the remote network device. Configuration modifications are implemented using either a secure protocol or an unsecured protocol.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A remote network device having a network security policy, comprising:
 a firewall component embedded within the network device to filter data flow within a network;
 a user-defined network security policy for the firewall component to define constraints on data flows permitted by the network device; and
 a fixed failsafe protocol to enable remote control of the device independent of the user-defined network security policy and the firewall filter, wherein the failsafe protocol enables access when the device is otherwise unreachable due to its user-defined network security policy.

2. The device of claim 1 wherein the remote network device is a headless device without any local user interface.

3. The device of claim 1 wherein the network is the Internet.

4. The device of claim 1 further comprising a disable line for disabling the failsafe protocol.

5. The device of claim 1 wherein the failsafe protocol is one of a plurality of failsafe protocols made available in the remote network device prior to its use in the network.

6. The device of claim 1 wherein the failsafe protocol bypasses an ordered rule set in a network security policy.

7. A method of enabling remote control of as remote network device that is otherwise unreachable due to its network security policy, comprising:
   defining constraints on data flows permitted by the network device to establish a network security policy;
   filtering from the data flows data which does not meet the permitted defined constraints to implement the network security policy; and
   enabling remote control of the device independent of the constraints in the network security policy via a failsafe protocol, the failsafe secure protocol providing alternate secure access to the device.

8. The method of claim 7 wherein the network device is otherwise unreachable due to its network security policy being unusable.

9. The method of claim 7 further comprising allowing continuous access to the network device through the failsafe secure protocol.

10. The method of claim 7 further comprising testing the network security policy through the failsafe secure protocol.

11. The method of claim 7 wherein remote control of the device further comprises disabling remote control of the device when the network security policy is working correctly.

12. The method of claim 7 wherein remote control of the device further comprises disabling remote control of the device when the network security policy is no longer needed for testing purposes.

13. The method of claim 7 further comprising changing constraints in the network security policy without resetting default settings on the remote network device.

14. The method of claim 7 wherein the remote network device is a headless device without any local user interface.

15. The method of claim 7 wherein a network for the remote network device is the Internet.

16. The method of claim 7 wherein the failsafe secure protocol enables remote control of the remote network device independent of the network security policy and a firewall filter when the remote network device is otherwise unreachable due to its network security policy.

17. A method of maintaining access to a remote network device through its firewall when the remote network device has an unusable network security policy, comprising:
   configuring the remote network device firewall with a network security policy and a firewall filter bypass; and
   accessing the network device through the firewall filter bypass, the bypass providing alternate secure access to the remote network device.

18. The method of claim 17 wherein configuring the remote network device is implemented using either a secure protocol or an unsecured protocol.

19. The method of claim 17 further comprising changing configuration of the remote network device without resetting default settings.

20. The method of claim 17 further comprising enabling remote control of the remote network device via a failsafe secure protocol independent of the network security policy and a firewall filter when the remote network device is otherwise unreachable due to its network security policy.

* * * * *

UNITED STATES PATENT AND TRADEMARK OFFICE
CERTIFICATE OF CORRECTION

| | |
|---|---|
| PATENT NO. | : 8,291,483 B2 |
| APPLICATION NO. | : 11/799206 |
| DATED | : October 16, 2012 |
| INVENTOR(S) | : Sherry Krell et al. |

It is certified that error appears in the above-identified patent and that said Letters Patent is hereby corrected as shown below:

In column 5, line 13, in Claim 7, delete "as" and insert -- a --, therefor.

Signed and Sealed this
Fifth Day of February, 2013

Teresa Stanek Rea
*Acting Director of the United States Patent and Trademark Office*